United States Patent Office 3,099,897
Patented Aug. 6, 1963

3,099,897
PROCESS FOR MULCHING WITH MICA
Henry A. Letteron, Schenectady, N.Y., assignor to General Electric Company, a corporation of New York
No Drawing. Filed June 28, 1961, Ser. No. 120,172
2 Claims. (Cl. 47—9)

This invention relates to agriculture. More particularly, the invention relates to the process of mulching with micaceous materials which are useful in inhibiting undesirable plant growth as well as for conditioning soil, and in encouraging the growth of desired plants.

The use of mulching materials in agriculture for inhibiting the growth of weeds or other undesirable plants and to preserve the moisture in the soil as well as its loosened, tilled condition is well known. Among the materials which have been thus used is paper or other fibrous materials which are often laid down by means of a slurry of the material which is then allowed to dry to form a covering over the ground which will permit the flow therethrough of water and at the same time to prevent the growth of undesirable weeds and the like. Such materials are generally placed around already existing desired plants or are used to cover an entire area of ground which is then perforated at points where seeding and the growth of desired plants are desired. After the mulching material has served its purpose, it is usually intermixed with the soil and becomes a part thereof. At times, asphalt or other water-resistant materials are mixed with the paper layer-forming material to provide resistance to violent rain or other natural disturbances which would tend to disrupt the layer. Resin films are also used for this purpose, such materials being removed after it has served its purpose.

While paper mulches are acceptable in some respects, their use is accompanied by a number of disadvantages. At times the paper pulp itself may be the product of a process in which chemicals, which may be deleterious to the soil, are used and which remain in the paper pulp as it is spread on the soil and eventually mixed therewith. Unless measures are taken to properly fireproof the paper material, and this is particularly true in the case of such mulches which are treated with waterproofing materials, such as asphalt and the like, these mulches are particularly susceptible to brush fires and the like with possible consequent loss of the very crops whose growth they are intended to promte. While the fibrous nature of such paper mulches is desirable in that they permit the ready flow therethrough of water, they are disadvantageous in that they are particularly subject to disruption and destruction by heavy rains, particularly if economical, light layers are laid down. Furthermore, while paper fibers themselves without adulterating chemicals, being of a cellulosic nature, add to the consistency of the soil, they tend to absorb large quantities of nitrate materials during their decomposition, thus creating a deficiency of this valuable growth promoting material in the soil and requiring the use of excess fertilizer to compensate for this loss if nitrogen-starvation of the soil is to be prevented.

A principal object of this invention is to provide improved mulching material for promoting desired plant growth in soil, which is particularly efficacious in inhibiting the growth of undesirable plants and which, after it has served its purpose, enters with mixing or otherwise into the soil composition itself, conditioning it and loosening it so that soil so treated is actually improved as a growth promoting medium.

Briefly, the invention relates to mulching and soil conditioning materials comprising finely divided "surface-active" micaceous material.

Those features of the invention which are believed to be novel are set forth in the claims appended hereto. The invention will, however, be better understood and further advantages and objects thereof appreciated from a consideration of the following description.

Any of the well known naturally-occurring mica or micaceous materials, as well as similar synthetic materials, can be used in the practice of this invention. The term "mica" is used herein as applying to all such materials. The micaceous material is finely divided by any of the well known processes which produce "surface-active" material among which is that described in Bardet Patent 2,549,880, among others. According to this process, the mica containing some water is dehydrated at an elevated temperature of the order of about 800° C., after which the treated flakes are placed in a liquid medium where they are broken up to form a pulp which is typically in water. The water medium can then be removed as in paper-making processes to provide a paper of reconstituted mica.

Another process for producing the finely divided micaceous material is that disclosed in copending application Serial No. 810,566, filed May 4, 1959, assigned to the same assignee as this invention and included herein by reference. There is described in this application the process of delaminating micaeous and similar material by coating the material with an adhesive and applying a peeling force which is greater than the bonding force between the physical elements of the material. This process, when applied repetitively, reduces the material to a very fine state. Upon removal of the adhesive, fine platelets are produced which can be formed into a slurry with water for the present purpose. This process does not depend upon dehydration of the mica and can, therefore, be applied to any micaceous or plate-like material to provide platelets having tightly clingable surfaces in the dry or partially dry state.

The present micaceous materials are characterized by the fact that the tiny flakes or platelets so produced are "surface-active" or have active or virgin surfaces which, when the platelets are laid down in a layer from a water or other compatible liquid slurry, are tightly interlocked.

The slurry of mica flakes in water can be used as is and applied directly to the soil as described hereinafter. Alternatively, for ease of shipment, all or part of the water may be removed from the material and the slurry regenerated at the point of use by the addition of water and mixing. The material can also be shipped in the form of a pulp or paper which can be re-dispersed in liquid at the point of use. It will also be obvious that the paper itself can be laid down as a mulch where the laying down of a slurry is not indicated. Another means of conveniently shipping the material is in the form of dehydrated cubes, pellets and the like.

The slurry can be applied to the soil in any well known manner. It can, for example, simply be poured on the soil. However, from the point of view of economy of material and ease of application, it is preferred to spray or sprinkle the slurry on the ground through the use of any well known apparatus. The mica so laid down on the ground surface after most of the water has soaked into the ground forms a continuous mulching layer in which the finely divided mica platelets engage in overlapping fashion with the surface of the platelets clinging tightly one to the other. This sheath-like nature of the layer also protects it against disruption by the rainwater and the like. While, of course, the thickness of the micaceous layer so laid down in any particular time will depend upon the concentration of the slurry, it is preferred once again from the point of view of ease of application and utilization of ordinary applying equipment to use a slurry which has a mica content of from about 2 to 7 percent and most preferably about 5 percent, by weight, with the rest being water or other suitable liquid medium. The slurry can be applied to the soil before planting and perforations made therein for the insertion of seeds of desirable plant growth. On the other hand, the slurry can as well be applied after the first appearance of the desired plant life with the slurry being sprayed either in the immediate area of the plant or over the entire growing area to prevent the growth of weeds. The plate- or layer-like character of the finely divided mica is of particular utility in that while it, to a desirable extent, permits, the penetration or flow therethrough of water, it, since it has a specific gravity of about 2.5, tends to remain in place and resist disruption of the continuity of the layer and hence the destruction of its inhibiting character. Since such micaceous materials are not flammable, there is no danger of crop failure through accidental igniting of the mulch material. While the material may be laid down in any desired thickness, a thickness of only about 2 mils on the ground surface which requires the use of about 2 ounces of mica per square yard has been found to be effective. The ability of the micaceous layer to conform to the irregularities in the ground surface is further enhanced by the fact that it is very limber in the presence of very small amounts of water of the order of 0.2 percent based on the combined weight of mica and water. Such amounts of water are normally naturally-occurring in soil.

As pointed out above, a particular advantage of the present micaceous slurry as a mulching material lies in the fact that it does not, during its subsequent admixture with the soil and further disintegration, take from the soil any of the beneficial components, such as nitrates, which are useful to growth itself. On the other hand, since its usefulness as a mulch depends in large degree on the tightly adhering quality which the platelets have to each other, foreign materials which destroy this clinging nature should not be used.

What I claim as new and desire to secure by Letters Patent of the United States is:

1. The process of mulching plant growth which comprises applying to the soil about said plant growth a slurry of surface-active mica in water, said mica constituting from about 2 to 7 percent, by weight, of said slurry.

2. The process of mulching plant growth which comprises applying to the soil about said growth a mulch comprising a slurry of water and surface-active mica, said mica comprising about 5 percent, by weight, of said slurry.

References Cited in the file of this patent
UNITED STATES PATENTS

| | | |
|---|---|---|
| 109,486 | Beck | Nov. 20, 1870 |
| 1,882,377 | Whittelsey | Oct. 11, 1932 |
| 2,036,913 | Brown et al. | Apr. 7, 1936 |
| 2,549,880 | Bardet | Apr. 24, 1951 |
| 2,669,804 | Cohen | Feb. 23, 1954 |
| 2,802,303 | Weeks | Aug. 13, 1957 |
| 2,842,183 | Gaines | July 8, 1958 |

FOREIGN PATENTS

| | | |
|---|---|---|
| 142,074 | Switzerland | Nov. 1, 1930 |

OTHER REFERENCES

Condensed Chemical Dictionary, 5th edition, published by Reinhold (New York), 1965. Pages 414, 728 and 1151 relied on.